(12) United States Patent
Kimura et al.

(10) Patent No.: US 6,482,867 B1
(45) Date of Patent: Nov. 19, 2002

(54) POLYMER PACKING MATERIAL FOR LIQUID CHROMATOGRAPHY AND A PRODUCING METHOD THEREOF

(75) Inventors: Tomohiko Kimura, Yokohama; Masashi Teramachi; Ken Hosoya, both of Kyoto; Yutaka Ohtsu, Yokohama, all of (JP)

(73) Assignee: Shiseido Co., Ltd., Tokyo (JP)

( * ) Notice: Subject to any disclaimer, the term of this patent is extended or adjusted under 35 U.S.C. 154(b) by 0 days.

(21) Appl. No.: 09/378,636

(22) Filed: Aug. 20, 1999

(30) Foreign Application Priority Data

Aug. 28, 1998 (JP) ............................. 10-243543
Dec. 22, 1998 (JP) ............................. 10-364970

(51) Int. Cl.[7] .............................................. C08F 32/04
(52) U.S. Cl. ...................... 521/149; 521/150; 210/635; 210/656; 210/198.2
(58) Field of Search ................ 521/149, 150; 210/635, 656, 198.2

(56) References Cited

U.S. PATENT DOCUMENTS 5,114,577 A * 5/1992 Kusano et al. ........... 210/198.2
5,254,634 A * 10/1993 Ito et al. .................. 525/330.3
5,712,358 A * 1/1998 Sojka ...................... 526/323.2

FOREIGN PATENT DOCUMENTS

| DE | 0826704 | 3/1998 |
| EP | 0370259 | 5/1990 |
| EP | 0575488 | 12/1993 |
| EP | 0903579 | 3/1999 |
| GB | 1123465 | 8/1968 |
| WO | 9216581 | 10/1992 |
| WO | 9312167 | 6/1993 |
| WO | 9526988 | 10/1995 |

* cited by examiner

Primary Examiner—Rachel Gorr
Assistant Examiner—Melanie D. Bagwell
(74) Attorney, Agent, or Firm—Kenyon & Kenyon

(57) ABSTRACT

There are disclosed a polymer packing material suitable for liquid chromatography and a producing method thereof. The polymer packing material having a polymer particle based on a styrene skeleton with monodispersed particle distribution can be obtained by hydrophilic treatment of an inner surface of a micropore existing in a fine pore of the polymer packing material, or subsequent introduction of a hydrophobic group into the inner hydrophilic surface by chemical modification. A method of producing the polymer packing material suitable for liquid chromatography includes the step of polymerizing glycerol dimethacrylate as a crosslinking agent and 2-ethylhexl methacrylate as a monomer according to a two-step swelling polymerization process. Alternatively, the producing method includes the step of crosslinking and polymerizing only glycerol dimethacrylate to form a polymer, and introducing the hydrophobic group into the polymer by chemical modification.

8 Claims, 7 Drawing Sheets

POLYMER PACKING MATERIAL FOR LIQUID CHROMATOGRAPHY AND A PRODUCING METHOD THEREOF

BACKGROUND OF THE INVENTION

The present invention generally relates to liquid chromatography and particularly to a packing material for liquid chromatography and a producing method thereof. More particularly, the present invention relates to an improvement of a producing method of a polymer packing material according to a two-step swelling polymerization process, as well as to a polymer packing material produced in accordance with such a process for liquid chromatography.

The packing material for high performance liquid chromatography (HPLC) is generally classified either as an inorganic packing material based on an inorganic carrier or as an organic polymer packing material on the basis of an organic polymer.

In actual use, inorganic packing materials based on silica gel are used most frequently. In reversed phase liquid chromatography, which occupies more than 60% of a total separation mode of HPLC, an alkylsilylated silica gel is used mainly, in which a surface of the silica gel carrier is subjected to chemical modification. While such conventional inorganic packing materials based on the silica gel exhibit an excellent separation characteristic and mechanical strength, there have been drawbacks in the conventional packing materials, such as low chemical stability or occurrence of an undesirable secondary retention effect caused by a silanol group remaining on the silica gel surface or by a metallic impurity contained in a silica gel base.

On the other hand, the organic polymer packing materials have an advantageous feature of good chemical stability and have been used for a packing material of size exclusion chromatography or ion exchange chromatography similarly to a silica gel packing material. The polymer packing materials can also be used in reversed phase liquid chromatography, particularly under a separation condition in which the use of silica gel packing material is not possible. Recently understanding of the separation characteristic of such organic packing materials has been increased, and there have been many reports showing that a separation characteristic superior to the separation characteristic of the silica gel packing material is obtained.

The polymer packing material, which is a crosslinked polymer, is generally classified either as that prepared from a natural polymer by a crosslinking process or as that synthesized by a polymerization process of a vinyl monomer. The representative examples of the former include packing materials prepared from polysaccharide derivatives such as agarose, dextran and mannan. These materials, however, may not be used for the packing material for HPLC because they generally suffer from a problem of a low withstand pressure. On the other hand, the synthetic polymer packing materials include polymers such as a polystyrene-divinylbenzene gel, a derivative thereof, a polymethacrylate gel and a polyacrylamide gel. Among the above synthetic polymers, the polystyrene-divinylbenzene gel and the polyacrylamide gel are chemically stable and used for the packing material in reversed phase liquid chromatography. It should be noted that these polymers are stable over a wide pH range as compared to the silica gel packing material and are not adversely affected by the metallic impurity. Such a synthetic organic polymer packing material is generally synthesized by mixing monomers together with a diluent and a crosslinking agent such that a porous structure can be formed. Fine pores can be formed when a good solvent is used for a polymer to be synthesized, while large pores tend to be formed when a poor solvent is used. Accordingly, a pore diameter can be controlled by choosing a combination of the diluent and the monomers. By using such a procedure, a spherical porous polymer packing material can be prepared in combination with a suspension polymerization process where its operation is simple.

However, such a polymer packing material has a structural problem with regard to distribution of the fine pores of a polymer particle. More specifically, the polymer packing material has a double pore structure having the fine pores and micropores, which arise in relation to a crosslinking structure of the polymer, wherein such micropores generally have a diameter less than 2 nm, unlike the fine pore (i.e., mesopore) of the silica gel packing material. Because of the existence of the micropores of the porous polymer particles, the extent of penetration of a solute molecule for the polymer packing material generally becomes large. The polymer packing material exhibits an inherent separation characteristic substantially different from that of the silica gel packing material when used for separation of a specimen in a column filled with this polymer packing material for chromatography. Since control for an effect of such micropores on resolution for chromatography is difficult, the use of the polymer packing material has frequently led to deterioration of resolution for sample analysis.

In actual HPLC analysis, an undesirable effect of such micropores is that retention of the specimen in the polymer packing material is strong. This effect takes place remarkably in a specimen with a large structure. In this case a width of a peak for the specimen becomes broad in a chromatograph, thereby reducing the number of theoretical plates. When the specimen passes through the micropores in a chromatography column, a smaller molecule than a size of these micropores is not subjected to a retention effect, while a large molecule is subjected to a retention effect caused by hydrophobic interaction with an inner surface of the micropores.

The undesirable effect for chromatography due to the micropores can be reduced by varying conditions of polymerization and crosslinking processes. That is to say, if a linear portion of the polymer synthesized by polymerization has the same length for each polymer chain and a length between crosslinking points becomes longer, this makes the micropore size bigger and the micropore size becomes approximately the same, thus allowing performance deterioration of the packing material to be inhibited. The degree of crosslinking can be lowered to extend the length between the crosslinking points. Because a lower ratio of crosslinking makes a strength of the polymer particle weak, it is impossible to use the above polymer for liquid chromatography as the packing material. It is required that the packing material should be prepared by controlling conditions and processes for polymerization and crosslinking reactions. For example, one of these control methods is an oxidation-reduction polymerization process at low temperature as polymerization of a monomer. By using this oxidation-reduction polymerization process, the micropore size becomes bigger and deterioration of the number of theoretical plates can be reduced, as compared to a conventional thermal polymerization in which the polymer particle can be generally prepared. Although this process is very useful in that the micropore size can be controlled, an improvement for the packing material performance is limited due to no change of a chemical nature of the inner surface of the micropores.

Thus, a problem of the micropore remains unsolved and hence the removal of the above problems remains as an important target of research of the polymer packing material.

SUMMARY OF THE INVENTION

Accordingly, it is a general object of the present invention to provide a polymer packing material for liquid chromatography and a producing method thereof wherein the foregoing problems are eliminated.

The inventors of the present invention have conducted various studies to achieve the aforementioned objects, and have discovered that a polymer packing material for liquid chromatography with an improved separation characteristic is obtained by modification of a chemical property of the inner surface of micropores of the polymer packing material and formation of a monodispersed system of the polymer packing material. In addition, an appropriate producing method for the polymer packing material is developed.

According to one aspect of the present invention, there is provided a polymer packing material for liquid chromatography comprising:

the polymer packing material having a polymer particle based on a styrene skeleton with monodispersed particle distribution;

the polymer particle having a fine pore and a micropore existing in the fine pore; and the micropore having a hydrophilic inner surface.

The present invention relates to a polymer packing material for liquid chromatography comprising:

the polymer packing material synthesized by a two-step swelling polymerization process;

the polymer packing material having a polymer particle based on a styrene skeleton with monodispersed particle distribution;

the polymer particle having a fine pore and a micropore existing in the fine pore; and the micropore having a hydrophilic inner surface.

The present invention further relates to a method of producing a polymer packing material for liquid chromatography comprising the step of:

polymerizing glycerol dimethacrylate as a crosslinking agent and 2-ethylhexyl methacrylate as a monomer according to a two-step swelling polymerization process.

An advantage of the present invention is that it provides a polymer packing material for liquid chromatography having an excellent separation characteristic.

According to a further aspect of the present invention, there is provided a polymer packing material for liquid chromatography comprising:

the polymer packing material having a polymer particle based on a styrene skeleton with monodispersed particle distribution;

the polymer particle having a fine pore and a micropore existing in the fine pore;

the micropore having a hydrophilic inner surface; and the hydrophilic inner surface having a hydrophobic group introduced partially thereinto by chemical modification.

The present invention relates to a polymer packing material for liquid chromatography comprising:

the polymer packing material synthesized by a two-step swelling polymerization process;

the polymer packing material having a polymer particle based on a styrene skeleton with monodispersed particle distribution;

the polymer particle having a fine pore and a micropore existing in the fine pore;

the micropore having a hydrophilic inner surface; and the hydrophilic inner surface having a hydrophobic group introduced partially thereinto by chemical modification.

The present invention further relates to a method of producing a polymer packing material for liquid chromatography, the method comprising the steps of crosslinking and polymerizing only glycerol dimethacrylate according to a two-step swelling polymerization process, to form a polymer; and introducing a hydrophobic group into the polymer by chemical modification.

In a further advantage of the present invention, there is provided a polymer packing material which has an excellent separation characteristic and no swelling-shrinking problem.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
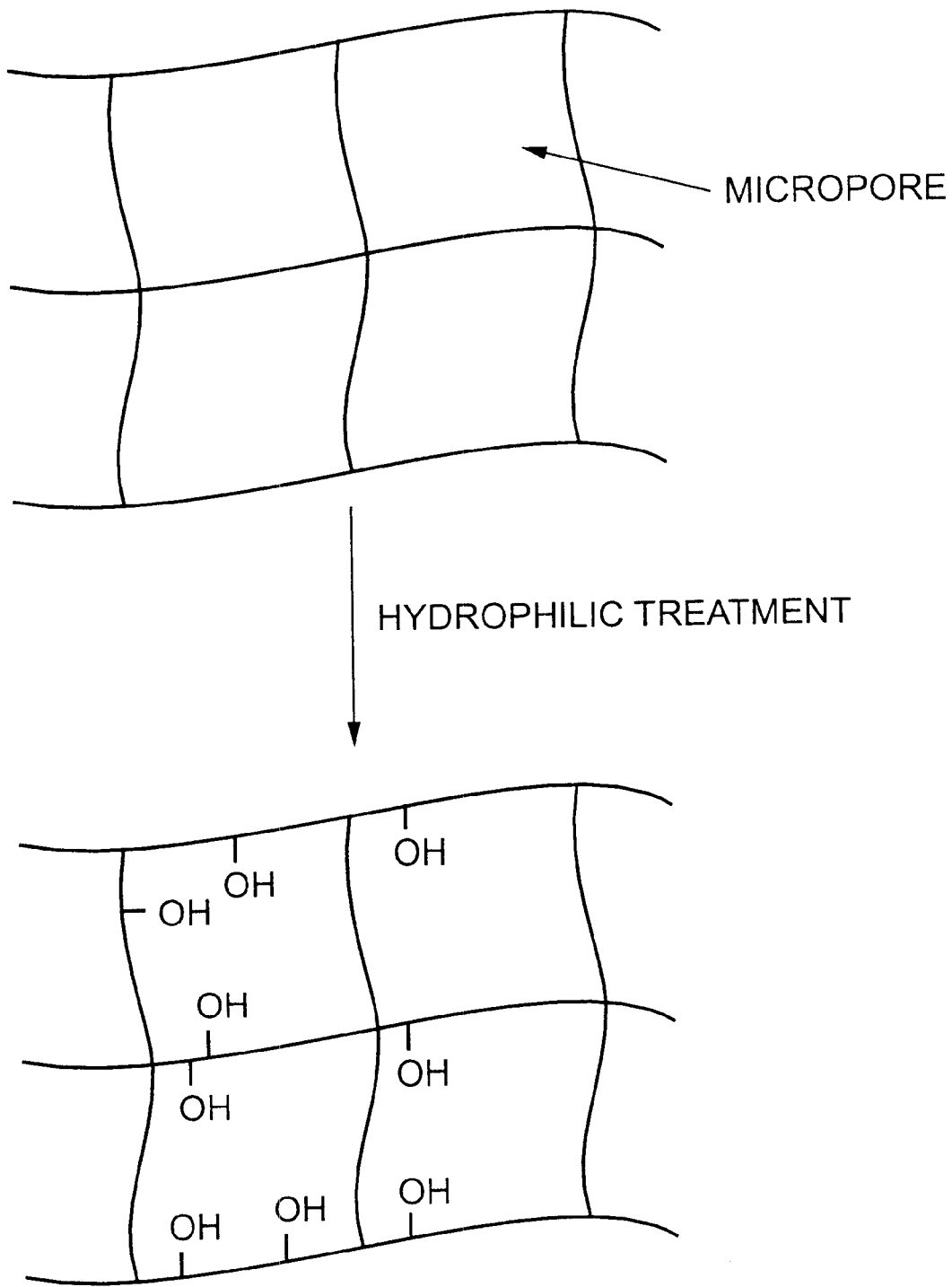
FIG. 1 shows an illustrative view of a polymer packing material of an embodiment according to the present invention.

Chemical property of micropores depends on kinds of a monomer constituting a polymer and a crosslinking agent. As noted above, deterioration of a separation characteristic of the polymer packing material for reversed phase liquid chromatography is due to hydrophobic interaction between a specimen and the micropores. While maintaining a retention ability of the polymer packing material for reversed phase liquid chromatography, introduction of a hydrophilic property into an inner surface of the micropores can weaken hydrophobic interaction between the specimen and the micropores.

However, the object of the present invention can not be effectively attained by a hydrophilic treatment or a hydrophilic treatment followed by chemical modification of an alkyl group and the like for the micropores as described in detail later. It has been found by the present inventors that failure of achievement for the above-mentioned object can be attributed to particle diameter distribution of the polymer packing material. This distribution is mainly originated from a producing method of the polymer packing material. Although the polymer packing material is primarily synthesized according to a suspension polymerization process, particle diameter distribution of the polymer particle synthesized by this process is very wide, and a desirable column performance can not be obtained with the column packed with this polymer particle. A broad width of particle diameter distribution induces deterioration of the number of theoretical plates. In addition, a smaller polymer particle than a desired diameter results in increase of a column pressure during analysis, and there is possibility that the polymer packing material which has low mechanical strength may be damaged. On the other hand, a larger polymer particle than the desired diameter results in deterioration of column performance because a smaller particle leads to an improvement of the separation characteristic.

A classification process of the synthesized polymer particle can be performed to select a desired portion having an appropriate particle diameter as the polymer packing material for chromatography. However, this classification process requires large special equipment, and it is very difficult to perform the classification process practically. So to accomplish the classification process successfully is virtually limited, and in fact the classification process results in a distribution of diameters having some width. High accuracy of the classification process causes only a small portion of the polymer particle synthesized initially to be effective for liquid chromatography, thus lowering yield as the packing material. This contributes to the increase of cost of the polymer packing material.

The inventors have adopted a well-known two-step swelling polymerization process to obtain the polymer packing material with monodispersed particle distribution. As a specific producing method, using hydrophilic glycerol dimethacrylate as a crosslinking agent and hydrophobic 2-ethylhexyl methacrylate as a monomer, a polymer packing material for reversed phase liquid chromatography is prepared by crosslinking and polymerization reactions based on the two-step swelling polymerization process. As another procedure, using only hydrophilic glycerol dimethacrylate as the crosslinking agent, crosslinking and polymerization reactions are performed by the two-step swelling polymerization process. A resultant monodispersed polymer is modified by chemical introduction of the hydrophobic group so as to obtain a desirable polymer packing material for reversed phase liquid chromatography.

The present invention will be explained below in more detail by reference to the following examples. The present invention provides the polymer packing material which is subjected to hydrophilic treatment of an inner surface of the micropores existing in fine pores of the packing material particle with monodispersed particle distribution (FIRST EMBODIMENT), or which is subjected to hydrophilic treatment of the inner surface of the micropores existing in the fine pores of the packing material particle with monodispersed particle distribution and subsequent introduction of a hydrophobic group into the polymer particle by chemical modification (SECOND EMBODIMENT).

[FIRST EMBODIMENT]

FIG. 1 shows an illustrative view of a polymer packing material of the first embodiment according to the present invention. The present invention provides a polymer packing material comprising a polymer particle with monodispersed particle distribution, wherein the polymer particle has a fine pore and a micropore which exists in the fine pore and is subjected to a hydrophilic treatment. Although an ordinary polymer packing material has the micropore (usually its diameter is less than 2 nm) originated from a crosslinking polymer structure in addition to the fine pore (i.e., mesopore, not shown), the polymer packing material according to the present invention has an inner surface of the micropore subjected to a hydrophilic treatment (by a hydroxyl group in FIG. 1), thus lowering hydrophobic interaction with a specimen.

An example of a specific crosslinking agent is glycerol dimethacrylate, which is used in order to impart hydrophilicity to the inner surface of the micropore of the polymer packing material of the present invention. Glycerol dimethacrylate for the polymer packing material used in the present invention can be synthesized by, for example, addition reaction of glycidyl methacrylate with methacrylic acid. Glycerol dimethacrylate can be polymerized with hydrophobic monomers which are capable of polymerizing therewith. A balance between hydrophilicity and hydrophobicity of the micropore of a polymer can be controlled by a ratio of the hydrophobic monomer in the polymer.

Examples of the hydrophobic monomers include but are not limited to methacrylates having from five to 22 carbon atoms, such as methyl methacrylate, ethyl methacrylate, butyl methacrylate, 2-ethylhexyl methacrylate, propyl methacrylate, and the like. Among these monomers, preference is given to methyl methacrylate, butyl methacrylate and 2-ethylhexyl methacrylate. Particular preference is given to 2-ethylhexyl methacrylate. In a case of copolymerization of glycerol dimethacrylate and methyl methacrylate, a molar ratio of glycerol dimethacrylate to methyl metacrylate is preferably from 1:9 to 9:1. In a case of copolymerization of glycerol dimethacrylate and 2-ethylhexyl methacrylate, a molar ratio of the former to the latter is preferably from 1:9 to 9:1.

Therefore, the polymer packing material of the present invention derived from glycerol dimethacrylate as the crosslinking agent has the following formula in its structure.

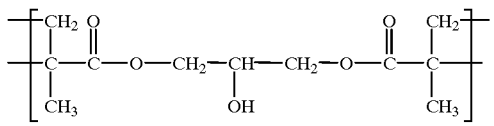

From the above formula, the polymer packing material with the above structural unit has the micropores subjected to the hydrophilic treatment by the hydroxyl group as a hydrophilic group.

In addition, the polymer packing material synthesized by methacrylates having from five to 22 carbon atoms as the monomer has the following formula in its structure,

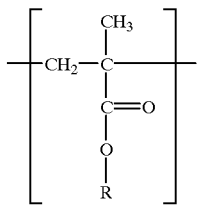

wherein R represents a hydrocarbon group having from 1 to 18 carbon atoms.

The polymer packing material having a monodispersed system for chromatography of the present invention can be produced by the well-known two-step swelling polymerization process by using glycerol dimethacrylate and hydrophobic methacrylate as the crosslinking agent and the monomer, respectively.

The two-step swelling polymerization process is a method of synthesizing a polymer particle having an uniformity of the polymer particle size. This process comprises the steps of: expanding a diameter of seed particles having an extremely uniform particle diameter of approximately 1 $\mu$m obtained according to a soap-free seed polymerization process by swelling of a swelling agent and the crosslinking agent sequentially in a two-step process, to form swelled particles; and subsequently polymerizing the monomers in the swelled particles. In this case, the uniformity of the particle diameter is not deteriorated during a swelling process, and a synthesis of a highly crosslinked polymer particle can be accomplished. A swell of the seed particles with a diluent together with the monomers also makes the polymer particles porous. Monodispersibility of the polymer particles obtained by this method is dependent on particle distribution of the seed particles. Because of good monodispersibility of the polymer particles, the packing material with the monodispersion particle system can easily be prepared without a further classification process. The uniformity of the particle size synthesized by this method is still better than that prepared by a conventional suspension polymerization process followed by a repeated classification process.

A skeleton of the polymer packing material can be made with the seed particle comprising a styrene compound as a core in the above two-step swelling polymerization process. Examples of the swelling agents used in the present invention include but are not limited to dibutyl phthalate. Examples of the diluents used in the present invention include but are not limited to cyclohexanol and toluene. Examples of radical initiators used in the present invention include but are not limited to benzoyl peroxide and azobisisobutyronitrile.

Since a column packed with the polymer packing material in the present invention for chromatography has a high uniformity of the particle diameter, the polymer packing material can control a pressure in the column. It is even possible to use a polymer packing material with low mechanical strength for liquid chromatography because of the high uniformity of the polymer packing material. If control of the column pressure can be accomplished, a polymer packing material comprising a smaller particle size can be applicable to liquid chromatography for high performance, thus leading to an improvement of the separation characteristic and permitting speed of separation to be high.

EXAMPLE 1

The Polymer Packing Material for Liquid Chromatography crosslinking agent: glycerol dimethacrylate
monomer: 2-ethylhexyl methacrylate
molar ratio: crosslinking agent: monomer=5:5
method of preparation: two-step swelling polymerization A seed particle based on a styrene skeleton with an extremely uniform particle size of approximately 1 $\mu$m obtained by soap-free seed polymerization was swollen in a first step by using dibutyl phthalate as a swelling agent. A mixture of 2-ethylhexyl methacrylate, glycerol dimethacrylate, cyclohexanol and azobisisobutyronitrile was then added and a second swelling process was carried out after stirring. Then, a polymerization reaction was accomplished for 24 hours at 70° C.

After completion of the reaction, a reaction mixture was cooled to room temperature and a product was then separated. The product was washed with water thoroughly, cyclohexanol was removed by using acetone, and then the resulting product was dried to give a fine porous spherical gel having the styrene skeleton.

Figure 2:
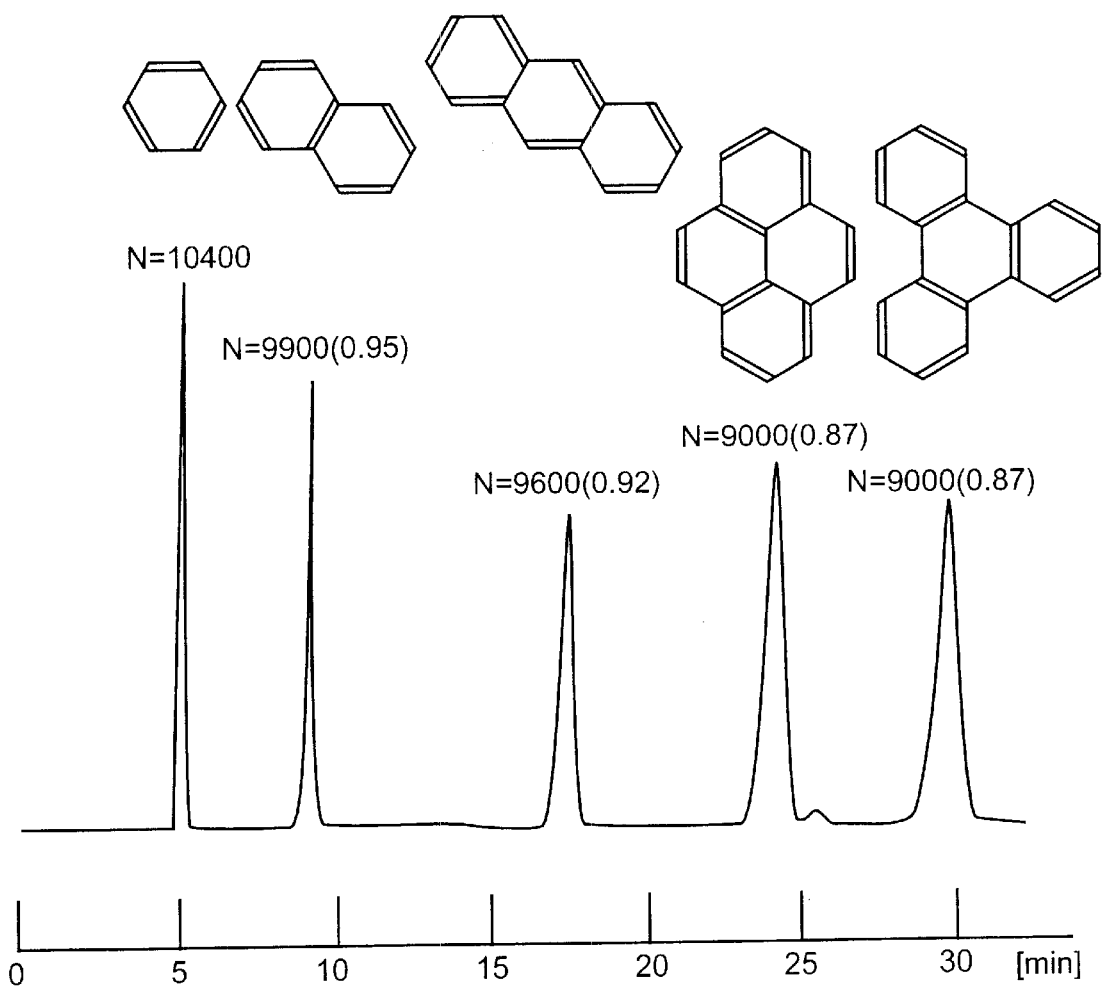
FIG. 2 shows an elution pattern of a mixture of five aromatic hydrocarbon cyclic compounds as a specimen obtained by reversed phase partition chromatography with a column packed with a polymer packing material synthesized in example 1.

FIG. 2 shows a result of sample analysis by liquid chromatography with a column packed with this polymer packing material. In this case, the sample includes a mixture of five aromatic hydrocarbon cyclic compounds comprising benzene, naphthalene, anthracene, pyrene, and triphenylene. From the result of FIG. 2, each peak for the respective sample is shown to be sharp separately. Thus, it is found that resolution is excellent when using this polymer packing material for liquid chromatography because the number of theoretical plates (N) is an extremely high value.

COMPARATIVE EXAMPLE 1

The Polymer Packing Material for Liquid Chromatography crosslinking agent: glycerol dimethacrylate
monomer: 2-ethylhexyl methacrylate
molar ratio: crosslinking agent: monomer=5:5
method of preparation: suspension polymerization A solution wherein polyvinyl alcohol was dissolved was added into a polymerization vessel. A mixture of glycerol dimethacrylate with 95% purity, cyclohexanol and azobisisobutyronitrile was then added into the solution and a polymerization reaction was carried out for 24 hours at 70° C. with stirring.

After completion of the reaction, a reaction mixture was cooled to room temperature and a product was then separated. The product was washed with water thoroughly, cyclohexanol was removed by using acetone, and then the resulting product was dried to give a fine porous spherical gel. Then, classification of the product gave a gel with a particle size ranging from 15 to 20 μm as a comparative polymer packing material.

Figure 3:
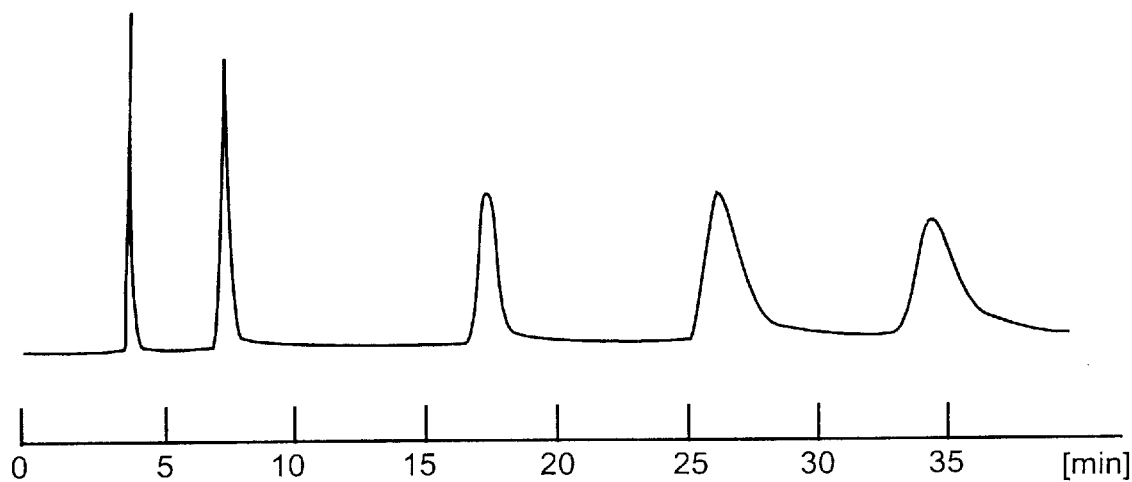
FIG. 3 shows an elution pattern of a mixture of five aromatic hydrocarbon cyclic compounds as a specimen obtained by reversed phase partition chromatography with a column filled with a polymer packing material synthesized in comparative example 1.

FIG. 3 shows a result of sample analysis by liquid chromatography with a column filled with the polymer packing material synthesized in comparative example 1. The same sample was used in this sample analysis. From the result of FIG. 3, benzene with a relatively low molecular weight shows a sharp peak, while a peak width becomes broad as the molecular weight of the sample is increased, thus lowering resolution of liquid chromatography.

Therefore, comparing example 1 with comparative example 1, even if the polymer packing material is synthesized by polymerization of the same crosslinking agent and monomer, a desired effect of the hydrophilic treatment of glycerol dimethacrylate for the micropores can not be obtained unless the particle size is extremely uniform. The two-step swelling polymerization process is very suitable for the method of producing the polymer packing material according to the present invention.

Moreover, there is a swelling-shrinking problem in the polymer packing material. The term swelling-shrinking refers to as property that the polymer particle is swollen and shrunk by action of a peripheral solution when present in solution. When the polymer packing material is used as the packing material for liquid chromatography, a size change of the polymer particle in a column makes column performance deteriorate remarkably. In other words, a swelling of the particle size in the column results in increase of a column pressure, thereby rendering the polymer particle to be useless. Furthermore, a shrinking of the polymer particle in the column provides a needless cavity in the column, thus reducing resolution for chromatography significantly. In fact, it is possible to use the polymer packing material with a mobile phase composition only in a restricted range, which does not allow the polymer particle to be swollen and shrunk.

[SECOND EMBODIMENT]

Figure 4:
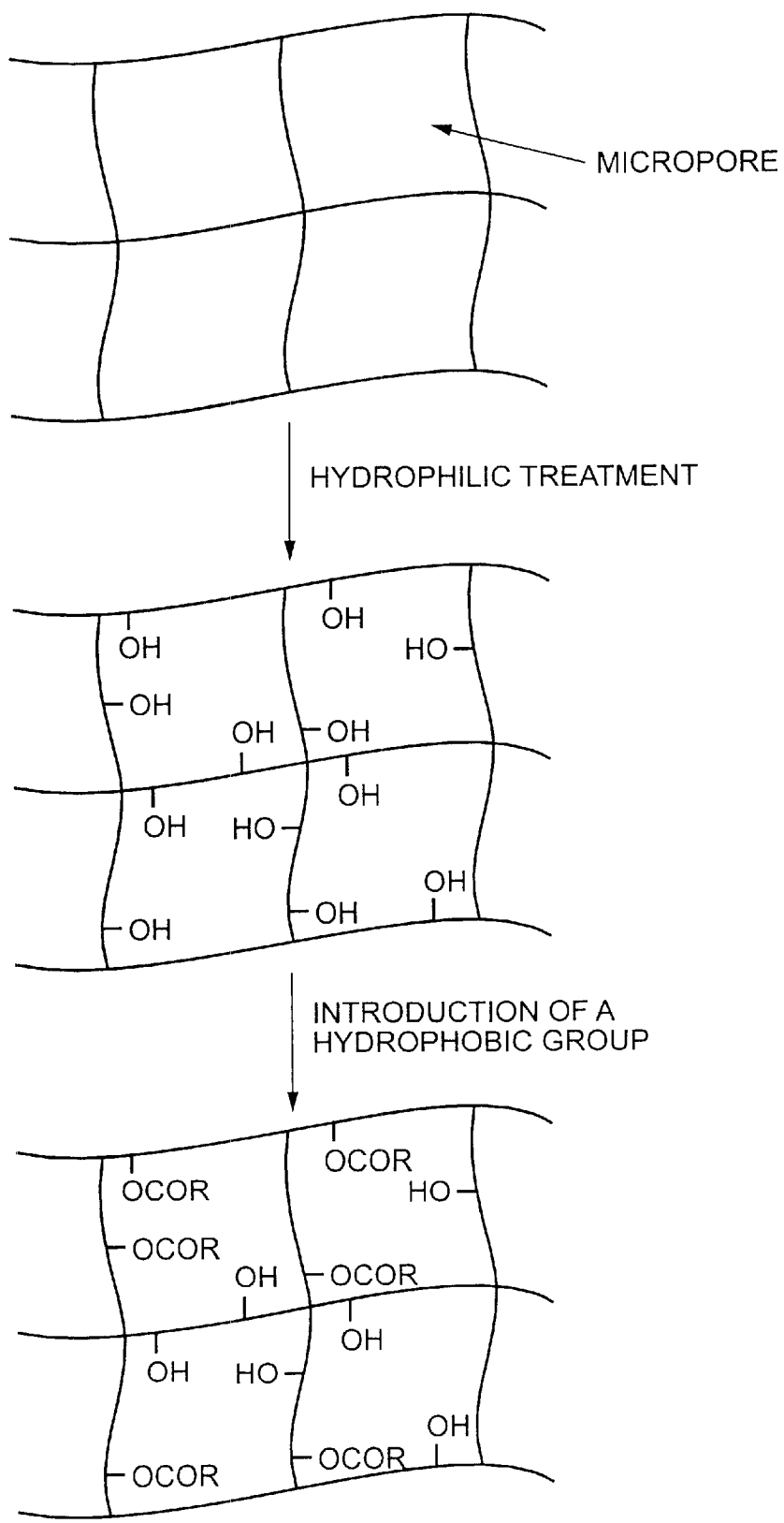
FIG. 4 shows an illustrative view of a polymer packing material of another embodiment according to the present invention.

In order to further inhibit the swelling-shrinking problem, the inventors have carried out crosslinking and polymerization reactions of only glycerol dimethacrylate and subsequent chemical modification by a hydrophobic group, such as an alkyl group, so that the polymer packing material has a retention ability for reversed phase liquid chromatography. FIG. 4 illustrates the above process as a schematic representation. Introduction of the hydrophobic group, such as the alkyl group and the like, into the polymer particle with good balance maintains a hydrophilic property to some extent and a retention ability of the micropores. A balance between hydrophilicity and hydrophobicity of the micropores of the polymer can be controlled suitably by a ratio of introduction of the hydrophobic group.

As a modifying agent, examples include hydrocarbon groups having from one to 18 carbon atoms, such as $CH_3(CH_2)_6COCl$, $CH_3(CH_2)_{16}COCl$, benzoyl chloride, and the like. Among these compounds, particular preference is given to a compound which is capable of introducing the alkyl group.

Thus, the polymer packing material of the present invention synthesized from glycerol dimethacrylate as the crosslinking agent has the following formula in its structure.

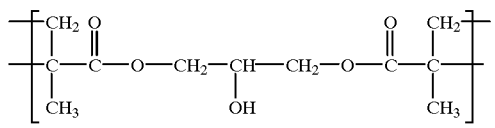

From the above formula, the polymer packing material with the above structural unit has the micropores subjected to the hydrophilic treatment by the hydroxyl group as a hydrophilic group.

In addition, the polymer packing material modified chemically has the following formula in its structure,

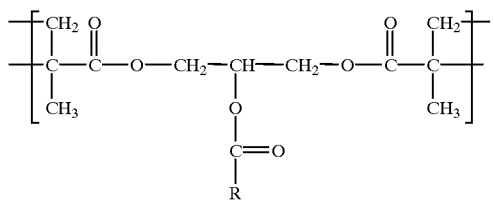

wherein R represents a hydrocarbon group having from 1 to 18 carbon atoms. In the above hydrocarbon group R, the number of carbon atom is up to 18 and the hydrocarbon group is preferably the alkyl group.

EXAMPLE 2

The Polymer Packing Material for Liquid Chromatography

The polymer packing material with monodispersed particle distribution for liquid chromatography of the present invention can be prepared by polymerization of only glycerol dimethacrylte as the crosslinking agent according to the two-step swelling polymerization process to form a polymer and subsequent introduction of the hydrocarbon group into the polymer by a general chemical modification.

crosslinking agent: glycerol dimethacrylate
hydrophobic group R: $CH_3(CH_2)_6-$
method of preparation: two-step swelling polymerization A seed particle based on a styrene skeleton with an extremely uniform particle size of approximately 1 μm obtained by soap-free seed polymerization was swollen in a first step by using dibutyl phthalate as a swelling agent. A mixture of glycerol dimethacrylate, cyclohexanol and azobisisobutyronitrile was then added and a second swelling process was then carried out after stirring. Then, a polymerization reaction was accomplished for 24 hours at 70° C.

After completion of the reaction, a reaction mixture was cooled to room temperature. Reaction of the above reaction mixture with $CH_3(CH_2)_6COCl$ was carried out to give a final product. The final product was washed with water fully, cyclohexanol was removed by using acetone, and then the resulting product was dried to give a fine porous spherical gel having the styrene skeleton.

COMPARATIVE EXAMPLE 2

A Silica Gel for Liquid Chromatography

A silica gel was used for the packing material in this comparative example.

Figure 5:
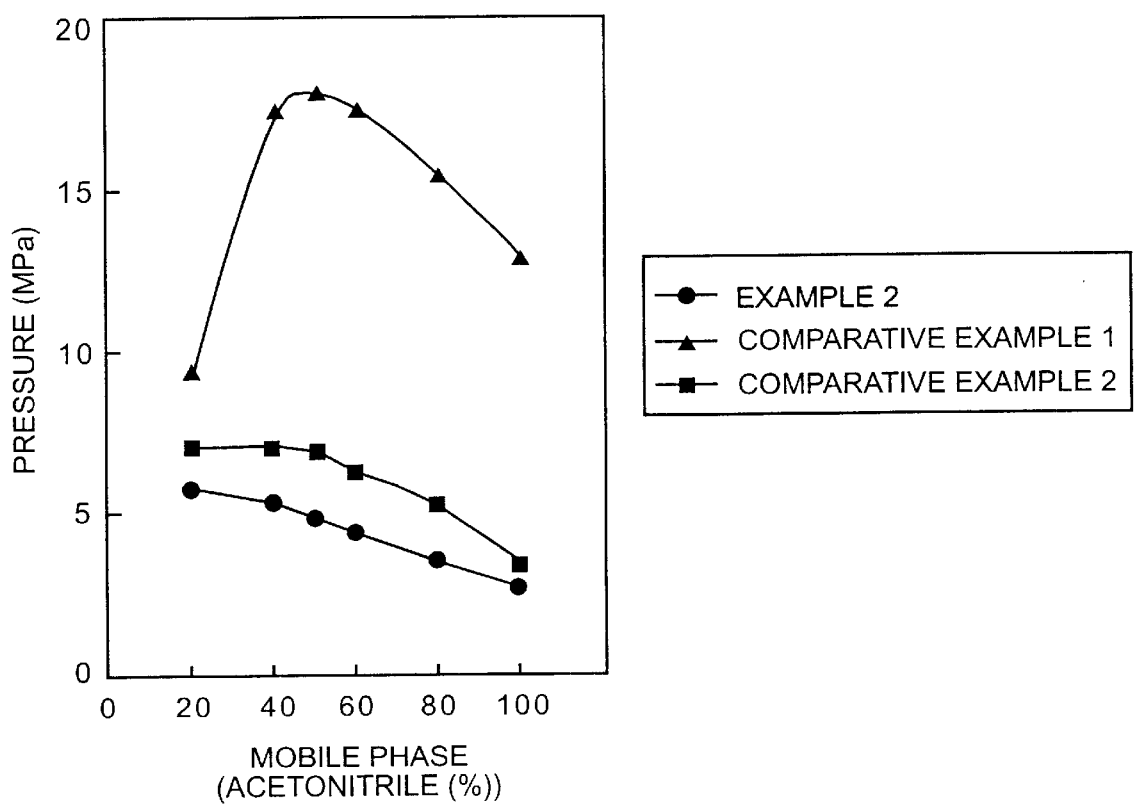
FIG. 5 illustrates a dependence of a pressure of columns packed with polymer packing materials synthesized in example 2, comparative example 1 and comparative example 2 on an acetonitrile concentration as a mobile phase.

FIG. 5 illustrates a result of a swelling-shrinking phenomenon of the packing material obtained by measuring a pressure in the column while varying an acetonitrile concentration as a mobile phase for each column packed with the respective packing material. From the result of FIG. 5, the polymer packing material synthesized by suspension polymerization of glycerol dimethacrylate and 2-ethylhexyl methacrylate in comparative example 1 shows that the column pressure changes significantly, depending on the acetonitrile concentration, thus indicating an occurrence of large swelling-shrinking in the column. On the other hand, the polymer packing material prepared by example 2 exhibits little swelling-shrinking in the column, and the degree of the swelling-shrinking is very similar to that of the silica gel. The lowering of a pressure in the column as the acetonitrile concentration reaches 100% is due to a decrease in viscosity of the mobile phase.

Therefore, the polymer packing material synthesized by example 2 has an excellent separation characteristic even under a condition that the mobile phase has a concentration gradient during analysis because this polymer packing material exhibits no swelling-shrinking phenomenon in the column regardless of the acetonitrile concentration. Moreover, it is found that the polymer packing material eliminating a swelling-shrinking problem in the present invention is obtained by polymerization of only glycerol methacrylate for the first time.

Figure 6:
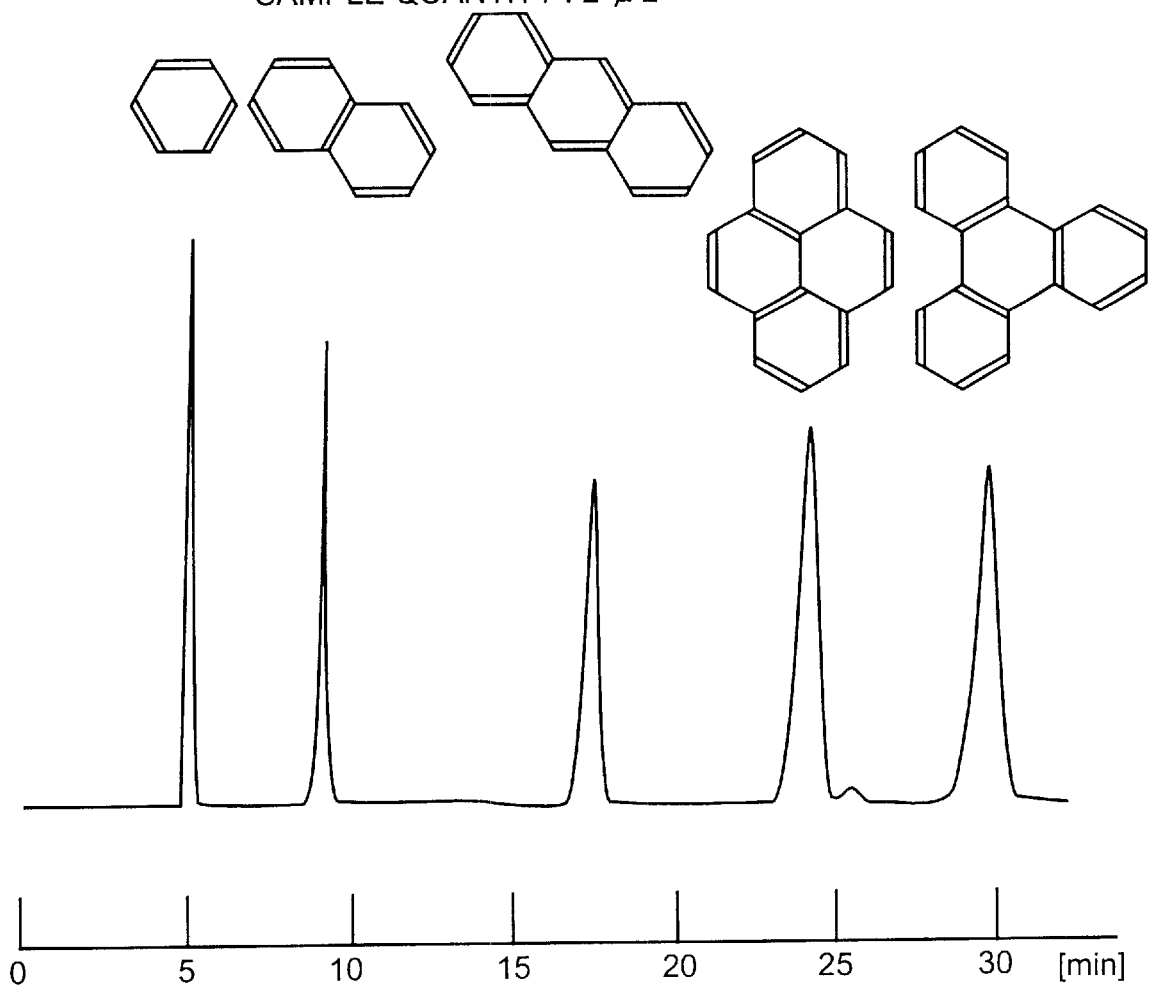
FIG. 6 shows an elution pattern of a mixture of five aromatic hydrocarbon cyclic compounds as a standard specimen obtained by reversed phase partition chromatography with a column packed with a polymer packing material prepared in example 2.

Next, FIG. 6 shows a result of a sample analysis with the column packed with the polymer packing material synthesized in example 2. A standard sample in FIG. 6 includes a mixture of five aromatic hydrocarbon cyclic compounds, that is, benzene, naphthalene, anthracene, pyrene, and triphenylene. From the result of FIG. 6, each peak for the five respective compounds is sharp separately, showing that this polymer packing material has an excellent resolution.

Figure 7:
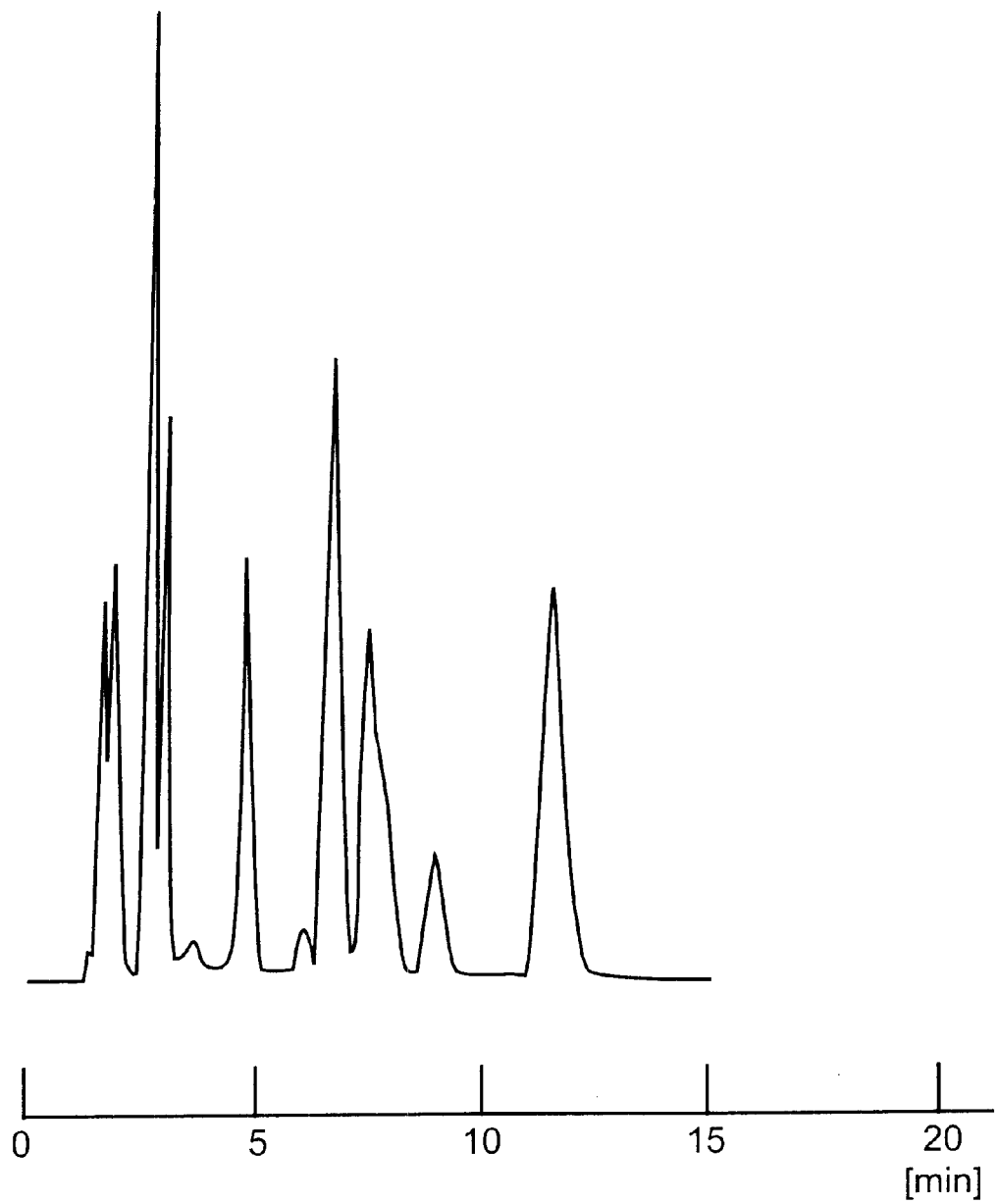
FIG. 7 shows an elution pattern of a mixture of 10 compounds as a standard specimen obtained by reversed phase partition chromatography with a column filled with a polymer packing material synthesized in example 2.

In addition, FIG. 7 also shows a result of a sample analysis with the column packed with the polymer packing material in example 2. The sample in FIG. 7 includes a mixture of 10 compounds. The compounds used in this analysis are uracil, caffeine, phenol, 2-ethylpyridine, methyl benzoate, benzene, toluene, N, N,-dimethylaniline, phenyl acetylacetone and naphthalene in order of elution. The polymer packing material synthesized in example 2 of the present invention has an excellent resolution as well as no swelling-shrinking problem.

The present invention is not limited to the specifically disclosed embodiments, and variations and modifications may be made without departing from the scope of the present invention.

The present application is based on Japanese priority application Nos. 10-243543 filed on Aug. 28, 1998 and 10-364970 filed on Dec. 22, 1998, the entire contents of which are hereby incorporated by reference.

What is claimed is:

1. A polymer packing material for liquid chromatography comprising:

said polymer packing material having a polymer particle based on a styrene skeleton with monodispersed particle distribution, wherein said polymer packing material includes the following formula I and formula II,

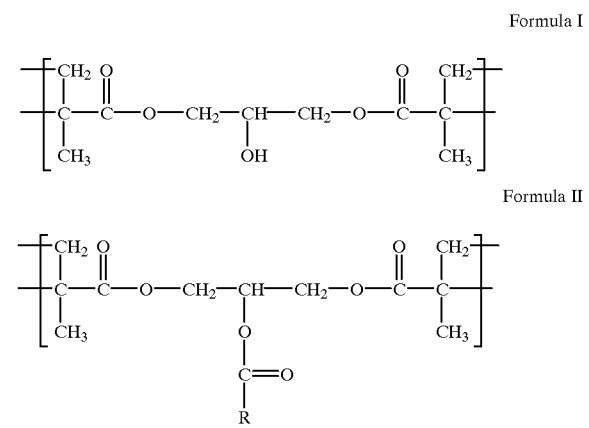

Formula I

Formula II wherein R in the formula II represents a hydrocarbon group having from one to 18 carbon atoms;

said polymer particle having a fine pore with a diameter larger than about 2 nm and a micropore with a diameter not larger than 2 nm existing in said fine pore;

said micropore having a hydrophilic inner surface; and said hydrophilic inner surface having a hydrophobic group introduced partially thereinto by chemical modification, wherein said hydrophobic group comprises from one to 18 carbon atoms.

2. A polymer packing material for liquid chromatography comprising:

said polymer packing material synthesized by a two-step swelling polymerization process;

said polymer packing material having a polymer particle based on a styrene skeleton with monodispersed particle distribution, wherein said polymer packing material includes the following formula I and formula II,

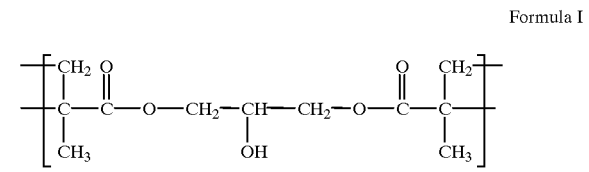

Formula I

-continued

Formula II

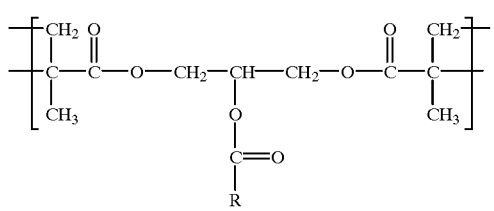

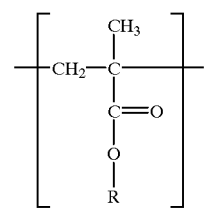

wherein R in the formula II represents a hydrocarbon group having from one to 18 carbon atoms;

said polymer particle having a fine pore with a diameter larger than about 2 nm and micropore with a diameter not larger than 2 nm existing in said fine pore;

said micropore having a hydrophilic inner surface; and said hydrophilic inner surface having a hydrophobic group introduced partially thereinto by chemical modification, wherein said hydrophobic group comprises from one to 18 carbon atoms.

3. A method of producing a polymer packing material for liquid chromatography, said method comprising the steps of:

crosslinking and polymerizing only glycerol dimethacrylate according to a two-step swelling polymerization process, to form a polymer; and introducing a hydrophobic group into said polymer by chemical modification.

4. A polymer packing material for liquid chromatography comprising:

said polymer packing material having a polymer particle based on a styrene skeleton with monodispersed particle distribution, wherein said polymer packing material includes the following formula III and formula IV, Formula III

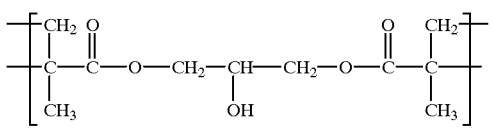

Formula IV

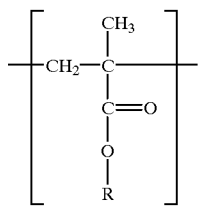

wherein R in formula IV represents a hydrocarbon group having from one to 18 carbon atoms;

said polymer particle having a fine pore with a diameter larger than about 2 nm and a micropore with a diameter not larger than 2 nm exsiting in said fine pore; and said micropore having a hydrophilic inner surface.

5. A polymer packing material for liquid chromatography comprising:

said polymer packing material having a polymer particle based on a styrene skeleton with monodispersed particle distribution, wherein said polymer packing material comprises glycerol dimethacrylate and 2-ethylhexyl methacrylate and includes the following formula III and formula IV;

Formula III

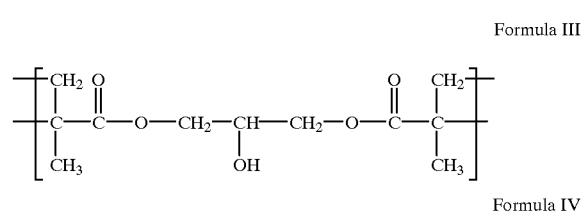

Formula IV

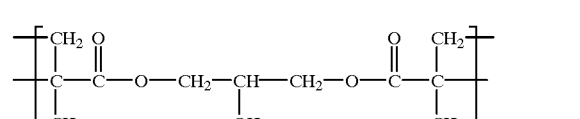

wherein R in formula IV represents a hydrocarbon group having from one to 18 carbon atoms and wherein R is a 2-ethylhexyl group;

said polymer particle having a fine pore with a diameter larger than about 2 nm and a micropore with a diameter not larger than 2 nm existing in said fine pore; and said micropore having a hydrophilic inner surface.

6. A polymer packing material for liquid chromatography comprising:

said polymer packing material synthesized by a two-step swelling polymerization process;

said polymer packing material having a polymer particle based on a styrene skeleton with monodispersed particle distribution;

said polymer particle having a fine pore with a diameter larger than about 2 nm and a micropore with a diameter not larger than 2 nm existing in said fine pore; and said micropore having a hydrophilic inner surface.

7. A polymer packing material for liquid chromatography comprising:

said polymer packing material having a polymer particle based on a styrene skeleton with monodispersed particle distribution, wherein said polymer packing material comprises glycerol dimethacrylate and 2-ethylhexyl methacrylate and includes the following formula III and formula IV;

Formula III

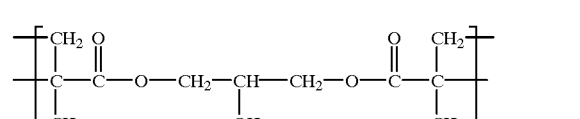

Formula IV

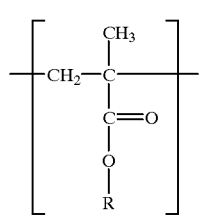

wherein R in formula IV represents a hydrocarbon group having from one to 18 carbon atoms and wherein R is a 2-ethylhexyl group;

said polymer particle having a fine pore with a diameter larger than about 2 nm and a micropore with a diameter not larger than 2 nm existing in said fine pore; and said micropore having a hydrophilic inner surface.

8. A method of producing a polymer packing material for liquid chromatography comprising the step of:

polymerizing glycerol dimethacrylate as a crosslinking agent and 2-ethylhexyl methacrylate as a monomer according to a two-step swelling polymerization process.

* * * * *